(12) United States Patent
Kong et al.

(10) Patent No.: US 8,526,556 B2
(45) Date of Patent: Sep. 3, 2013

(54) METHOD AND SYSTEM FOR DELAY LOCKED LOOP FOR RAKE RECEIVER

(75) Inventors: Hongwei Kong, Denville, NJ (US); Li Fung Chang, Holmdel, NJ (US); Huaiyu Zeng, Red Bank, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/614,642

(22) Filed: Sep. 13, 2012

(65) Prior Publication Data

US 2013/0010906 A1    Jan. 10, 2013

Related U.S. Application Data

(63) Continuation of application No. 11/610,744, filed on Dec. 14, 2006, now Pat. No. 8,275,082, which is a continuation-in-part of application No. 11/566,208, filed on Dec. 1, 2006, now abandoned.

(51) Int. Cl.
*H04L 7/00* (2006.01)

(52) U.S. Cl.
USPC ........... 375/355; 375/293; 375/316; 375/341; 375/354; 375/364

(58) Field of Classification Search
USPC .................. 375/143, 150, 243, 294, 327, 341, 375/354, 355, 364, 373, 376, 293, 316
See application file for complete search history.

(56) References Cited

U.S. PATENT DOCUMENTS

| | | | |
|---|---|---|---|
| 5,852,630 A | 12/1998 | Langberg et al. | |
| 6,795,452 B2 * | 9/2004 | Iancu | 370/515 |
| 6,822,999 B1 * | 11/2004 | Lee et al. | 375/145 |
| 7,072,318 B2 * | 7/2006 | Shoji et al. | 370/335 |
| 7,376,210 B2 | 5/2008 | Kim et al. | |
| 7,630,321 B2 | 12/2009 | Jain et al. | |
| 7,639,995 B2 * | 12/2009 | Nicol et al. | 455/130 |
| 7,697,596 B2 * | 4/2010 | Li et al. | 375/148 |
| 7,751,466 B2 * | 7/2010 | Zeng | 375/148 |
| 8,077,794 B2 * | 12/2011 | Ishii et al. | 375/267 |
| 8,238,957 B2 * | 8/2012 | Natsume | 455/522 |
| 8,265,123 B2 * | 9/2012 | Ito et al. | 375/150 |
| 8,275,082 B2 | 9/2012 | Kong et al. | |
| 2003/0142729 A1 * | 7/2003 | Subrahmanya et al. | 375/147 |
| 2003/0202488 A1 * | 10/2003 | Hsuan | 370/331 |

(Continued)

FOREIGN PATENT DOCUMENTS

WO    WO2005/062728 A2    7/2005

*Primary Examiner* — Hirdepal Singh
(74) *Attorney, Agent, or Firm* — Stern, Kessler, Goldstein & Fox P.L.L.C.

(57) ABSTRACT

Certain aspects of a method and system for a delay locked loop for a rake receiver are disclosed. Aspects of one method may include normalizing a signal power of a first control channel based on a threshold value. A sampling time associated with at least one or more of the following: the first control channel, a second control channel, an on-time control channel, and a data channel, may be adjusted based on a comparison between the normalized signal power of the first control channel and a signal power of the second control channel. The second control channel may be delayed with respect to the first control channel by a particular time period. The first and second control channels may be common pilot control channels (CPICHs). The combined signal power of the first control channel may be normalized based on said threshold value.

20 Claims, 10 Drawing Sheets

(56) References Cited

U.S. PATENT DOCUMENTS

| | | | |
|---|---|---|---|
| 2006/0126574 A1* | 6/2006 | Bultan et al. | 370/335 |
| 2006/0171491 A1* | 8/2006 | Tapaninen et al. | 375/343 |
| 2006/0233221 A1* | 10/2006 | Xu et al. | 375/147 |
| 2006/0269018 A1* | 11/2006 | Li et al. | 375/343 |
| 2007/0098115 A1 | 5/2007 | Bachl et al. | |
| 2008/0043858 A1* | 2/2008 | Lim et al. | 375/260 |
| 2008/0056170 A1* | 3/2008 | Komulainen et al. | 370/311 |

* cited by examiner

METHOD AND SYSTEM FOR DELAY LOCKED LOOP FOR RAKE RECEIVER

CROSS-REFERENCE TO RELATED APPLICATIONS

This application is a continuation of U.S. application Ser. No. 11/610,744, filed Dec. 14, 2006, which will issue as U.S. Pat. No. 8,275,082 on Sep. 25, 2012, which is a continuation-in-part of U.S. application Ser. No. 11/566,208, filed Dec. 1, 2006, now abandoned, all of which are incorporated by reference in its entirety.

This application also makes reference to:
U.S. patent application Ser. No. 11/607,438 filed on Dec. 1, 2006; and
U.S. patent application Ser. No. 11/566,173 filed on Dec. 1, 2006.

Each of the above referenced applications is hereby incorporated herein by reference in its entirety.

FIELD OF THE INVENTION

Certain embodiments of the invention relate to rake receivers. More specifically, certain embodiments of the invention relate to a method and system for a delay locked loop for a rake receiver.

BACKGROUND OF THE INVENTION

Mobile communications has changed the way people communicate and mobile phones have been transformed from a luxury item to an essential part of every day life. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

However, implementing advanced wireless technologies such as WCDMA and/or high speed data packet access (HSDPA) may still require overcoming some architectural hurdles. For example, the RAKE receiver is the most commonly used receiver in CDMA systems, mainly due to its simplicity and reasonable performance. A RAKE receiver contains a bank of spreading sequence correlators, each receiving an individual multipath. A RAKE receiver operates on multiple discrete paths. The process of correctly identifying the propagation paths and placing rake fingers on these propagation paths to track the path positions may be critical to the receiver performance. The task of tracking the propagation path once a finger is assigned to that path may be challenging, given the wide dynamic range of the WCDMA/HSDPA signals. The received multipath signals may be combined in several ways, from which maximum ratio combining (MRC) is preferred in a coherent receiver. However, a RAKE receiver may be suboptimal in many practical systems. For example, its performance may degrade from multiple access interference (MAI), that is, interference induced by other users in the network.

In the case of a WCDMA downlink, MAI may result from intercell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intracell interference may be caused by multipath propagation. In some instances, intracell interference may comprise inter-path interference (IPI). IPI may occur when one or more paths, or RAKE "fingers," interfere with other paths within the RAKE receiver. Due to the non-zero cross-correlation between spreading sequences with arbitrary time shifts, interference occurs between propagation paths (or RAKE fingers) after despreading, thereby causing MAI. The level of intracell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a delay locked loop for a rake receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS 1A is a block diagram illustrating a wireless communication user equipment, in accordance with an embodiment of the invention.

DETAILED DESCRIPTION OF THE INVENTION

Certain embodiments of the invention may be found in a method and system for a delay locked loop for a rake receiver. Certain aspects of the invention may comprise normalizing a signal power of a first control channel based on a threshold value. A sampling time associated with at least one or more of the following: the first control channel, a second control channel, an on-time control channel, and a data channel may be adjusted based on a comparison between the normalized signal power of the first control channel and a signal power of the second control channel. The second control channel may be delayed with respect to the first control channel by a particular time period. The first and second control channels may be common pilot control channels (CPICHs). The combined signal power of the first control channel may be normalized based on said threshold value.

Figure 1A:
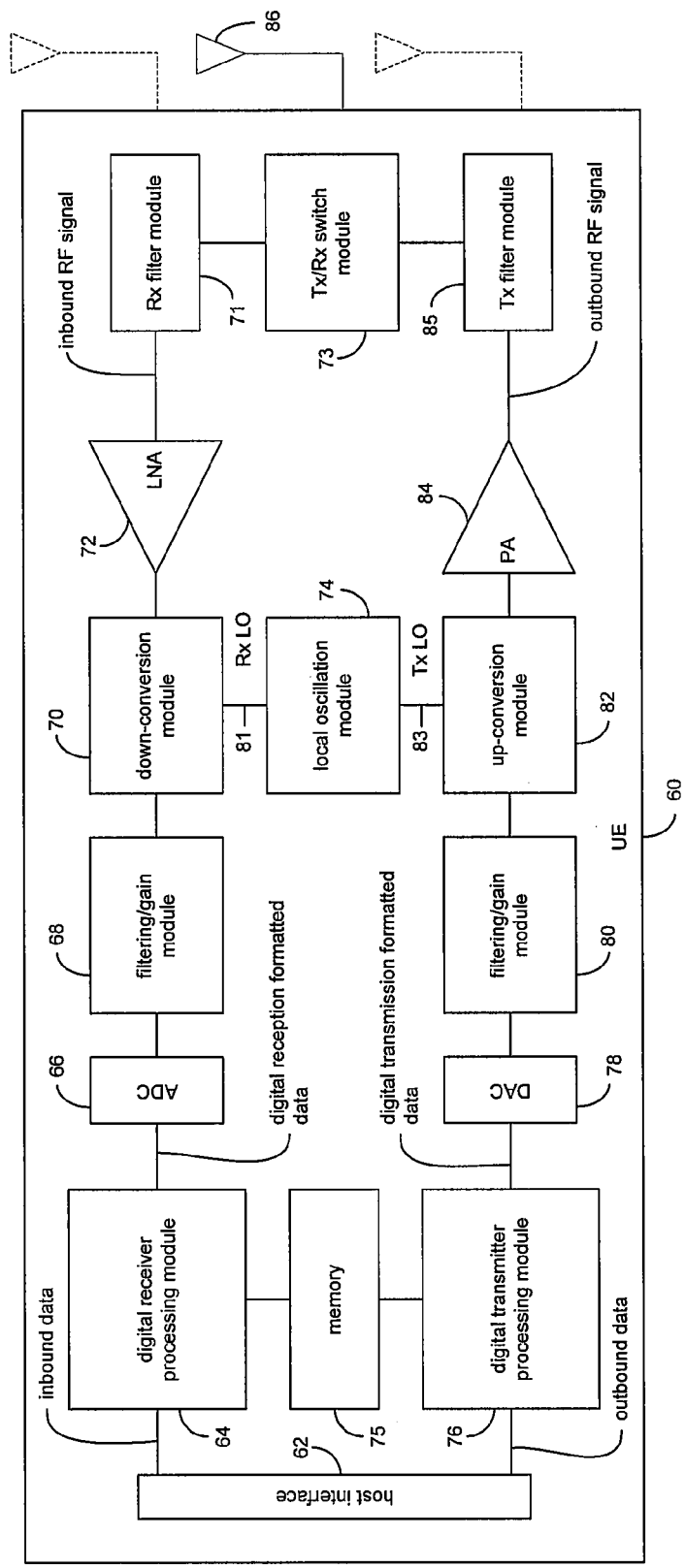
FIG. 1B is a block diagram of an exemplary rake receiver, in accordance with an embodiment of the invention.

FIG. 1A is a block diagram illustrating a wireless communication user equipment, in accordance with an embodiment of the invention. Referring to FIG. 1A, there is shown a user equipment (UE) 60.

The UE 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the UE 60 may be enabled to receive outbound data via host interface 62. The host interface 62 may be enabled to route outbound data to the digital transmitter processing module 76. The digital transmitter processing module 76 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The UE 60 may be enabled to receive an inbound RF signal via antenna 86, which was transmitted by a base station, an access point, or another wireless communication device. The antenna 86 may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to a wireless communication host device.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 1B:
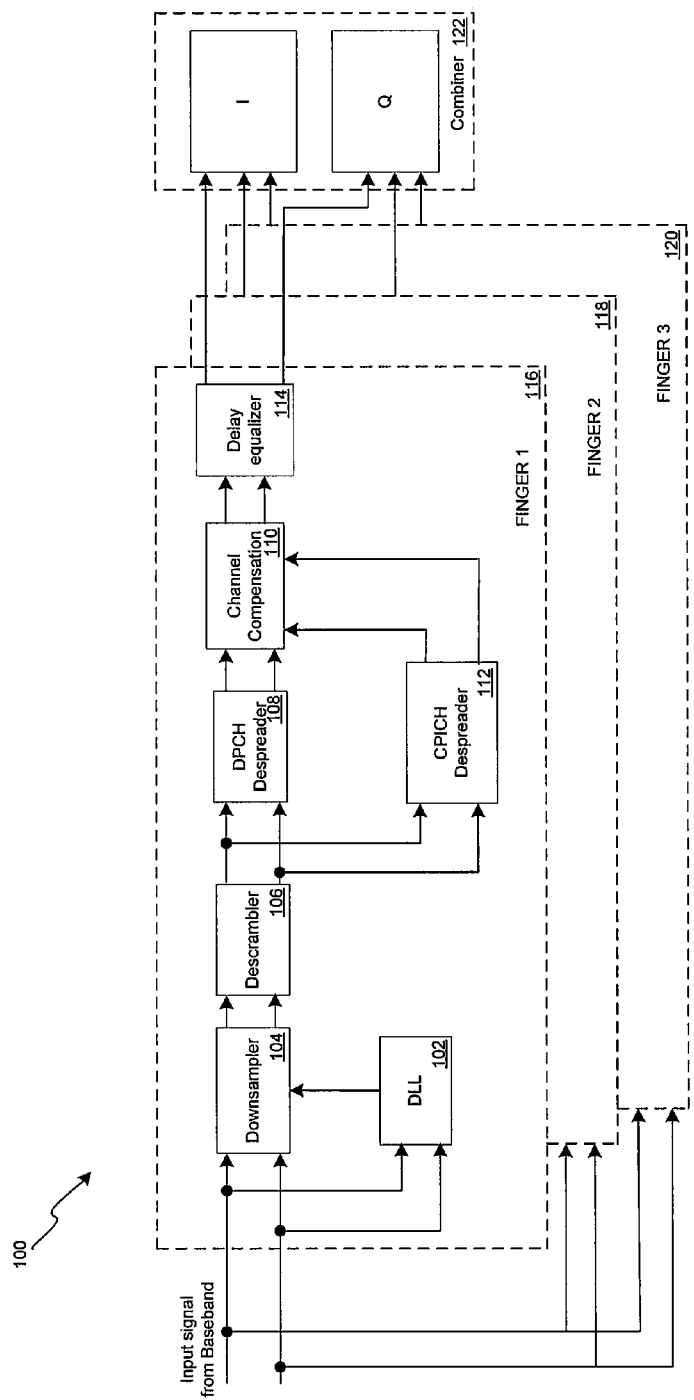

FIG. 1B is a block diagram of an exemplary rake receiver, in accordance with an embodiment of the invention. Referring to FIG. 1B, there is shown a rake receiver 100. The rake receiver 100 may comprise a plurality of rake fingers, finger 1 116, finger 2 118, finger 3 120, and a combiner 122. Each rake finger, for example, finger 1 116 may comprise a downsampler 104, a delay locked loop (DLL) block 102, a descrambler 106, a DPCH despreader 108, a CPICH despreader 112, a channel compensation block 110, and a delay equalizer 114.

The DLL 102 may comprise suitable logic, circuitry and/or code that may be enabled to receive an input signal from baseband and generate an output signal to each rake finger, for example, finger 0 116, finger 1 118, and finger 3 120 based on a determined ratio of the accumulated signal power of an early offset path CPICH and a late offset path CPICH.

The downsampler 104 may comprise suitable logic, circuitry and/or code that may be enabled to receive the delayed output signal from the DLL 102 and the input signal from baseband and downsample the received signals. The downsampler 104 may output the downsampled received signals to the descrambler 106. The sampling instant, also known as the phase of the sampling, may be controlled by the output of DLL 102.

The descrambler 106 may comprise suitable logic, circuitry and/or code that may be enabled to multiply the received signals by a scrambling code and delayed versions of the scrambling code. Each delay may correspond to a separate multipath that may be combined by the rake receiver 100. The DPCH despreader 108 may comprise suitable logic, circuitry and/or code that may be enabled to despread the descrambled data of each path in the data channel by multiplying the despread data with an orthogonal variable spreading factor (OVSF) code. The CPICH despreader 112 may comprise suitable logic, circuitry and/or code that may be enabled to despread the descrambled data of each path in the control channel by multiplying the descrambled data with an OVSF code.

The channel compensation block 110 may comprise suitable logic, circuitry, and/or code that may be enabled to receive a plurality of generated channel estimates for each channel based on the descrambled signals and generate a plurality of derotated output signals to the delay equalizer 110. The delay equalizer 114 may comprise suitable logic, circuitry, and/or code that may be enabled to receive an input signal from the channel compensation block 110 and generate a delayed output signal to the combiner 122 to compensate for the delay in the difference of arrival times of symbols at each finger. The combiner 122 may comprise suitable logic, circuitry, and/or code that may be enabled to receive the I and Q signals from each finger, for example, finger 1 116, finger 2 118, and finger 3 120, and combine the received signals based on a combining algorithm, for example, maximum ratio combining.

The rake receiver 100 may be a radio receiver that may be designed to counter the effects of multipath fading by using a plurality of sub-receivers. Each sub-receiver may be delayed in order to tune to an individual multipath component. Each component may be decoded independently, and combined, which may result in a higher signal-to-noise ratio (SNR) (or Eb/No) in a multipath environment.

In the rake receiver 100, one rake finger may be assigned to each multipath, which may result in maximizing the amount of received signal energy. Each of these different multipath signals may be combined to form a composite signal that may have substantially better characteristics than a single path. The received signal may be split into a plurality of independent paths, which may be combined with their corresponding channel estimates.

Figure 2:
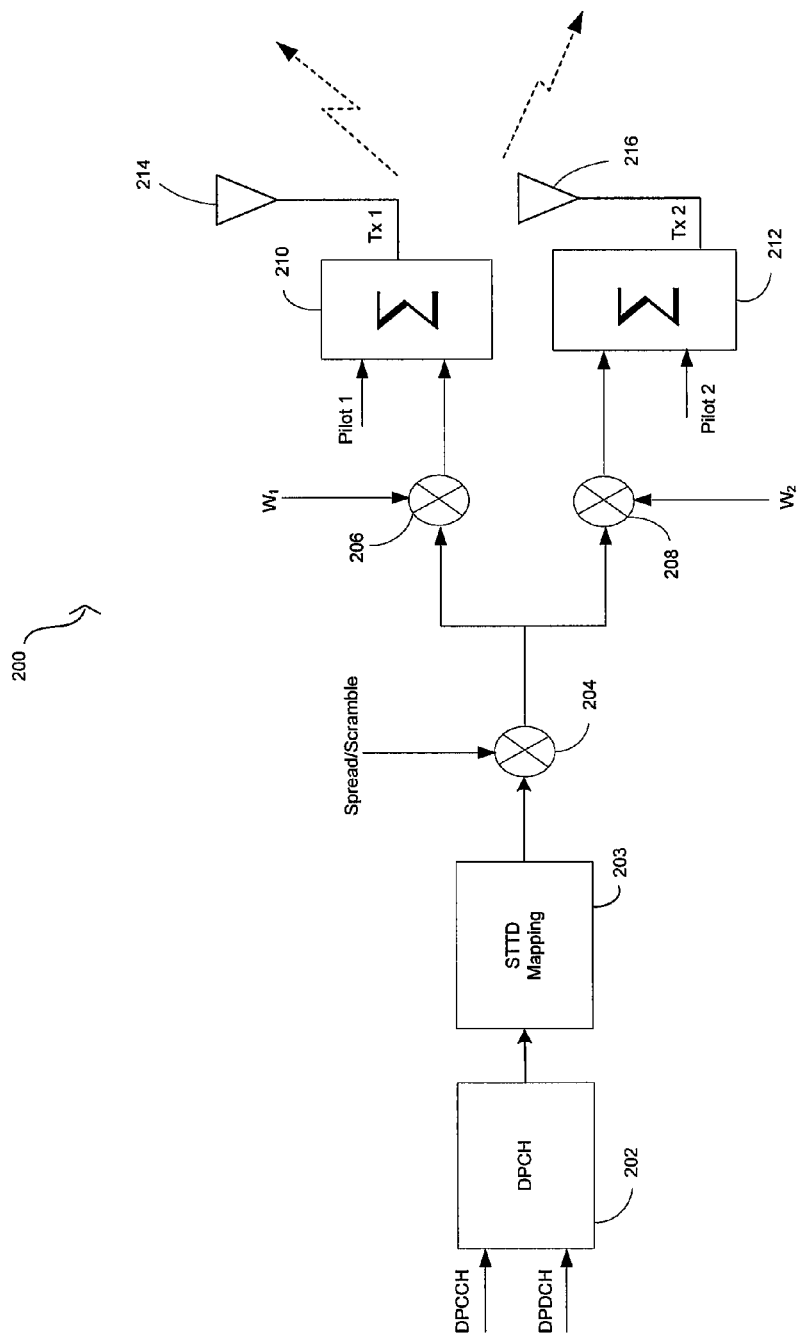
FIG. 2 is a block diagram of an exemplary transmitter with transmit antenna diversity, in accordance with an embodiment of the invention.

FIG. 2 is a block diagram of an exemplary transmitter with transmit antenna diversity, in accordance with an embodiment of the invention. Referring to FIG. 2, the transmitter 200 may comprise a dedicated physical channel (DPCH) block 202, a space time transmit diversity (STTD) mapping block 203, a plurality of mixers 204, 206, and 208, a plurality of combiners 210 and 212, a first transmit antenna (Tx 1) 214 and an additional transmit antenna (Tx 2) 216.

The DPCH block 202 may be enabled to receive a plurality of input channels, for example, a dedicated physical control channel (DPCCH) and a dedicated physical data channel (DPDCH). The DPCH block 202 may simultaneously control the power of DPCCH and DPDCH. The STTD mapping block 203 may be disabled for closed loop mode, and the plurality of weight factors, $W_1$ and $W_2$ may be determined by the user equipment (UE), and may be signaled to the UMTS terrestrial radio access network (UTRAN) access point or cell transceiver by utilizing the feed back indicator (FBI) field of uplink DPCCH. The STTD mapping block 203 may be enabled for open loop mode, and the plurality of weight factors, $W_1$ and $W_2$ may be determined by equal to 1, for example.

The mixer 204 may be enabled to mix the output of DPCH block 202 with a spread and/or scrambled signal to generate a spread complex valued signal that may be input to mixers 206 and 208. The mixers 206 and 208 may weight the complex valued input signals with weight factors $W_1$ and $W_2$, respectively, and may generate outputs to a plurality of combiners 210 and 212 respectively. The combiners 210 and 212 may combine the outputs generated by mixers 206 and 208 with a pilot channel 1, for example, common pilot channel 1 (CPICH1) and a pilot channel 2, for example, common pilot channel 2 (CPICH2) respectively. The common pilot channels 1 and 2 may have a fixed channelization code allocation that may be utilized to measure the phase amplitude signal strength of the channels. The antennas 214 and 216 may receive the generated outputs from the combiners 210 and 212 and may transmit wireless signals.

In closed loop mode 1 for example, the weight factor $W_1$ may be a constant scalar and the weight factor $W_2$ may be a complex valued signal. The weight factor $W_2$ or the corresponding phase adjustment $\phi$ may be determined by the user equipment (UE), and may be signaled to the UMTS terrestrial radio access network (UTRAN) access point or cell transceiver by utilizing the feed back indicator (FBI) field of uplink DPCCH. For closed loop mode 1, different orthogonal dedicated pilot symbols in the downlink DPCCH may be transmitted via the two antennas, for example. The UE may utilize the CPICH to separately estimate the channels seen from each antenna. The UE may compute the phase adjustment, $w_2=e^{j\Phi}$ once every slot, for example, and may be applied at the UTRAN access point to maximize the UE 60 received power.

In a non-soft handover case, the computation of feedback information may be computed by, for example, solving for weight vector, $\underline{w}$, that maximizes:

$$P=\underline{w}^H H^H H \underline{w} \tag{1}$$

where $H=[\underline{h}_1 \ \underline{h}_2]$ and $\underline{w}=[w_1, w_2]^T$ and where the column vectors $\underline{h}_1$ and $\underline{h}_2$ represent the estimated channel impulse responses for the transmission antennas 1 and 2, of length equal to the length of the channel impulse response, for example. The elements of $\underline{w}$ may correspond to the adjustments computed by the UE 60.

Figure 3A:
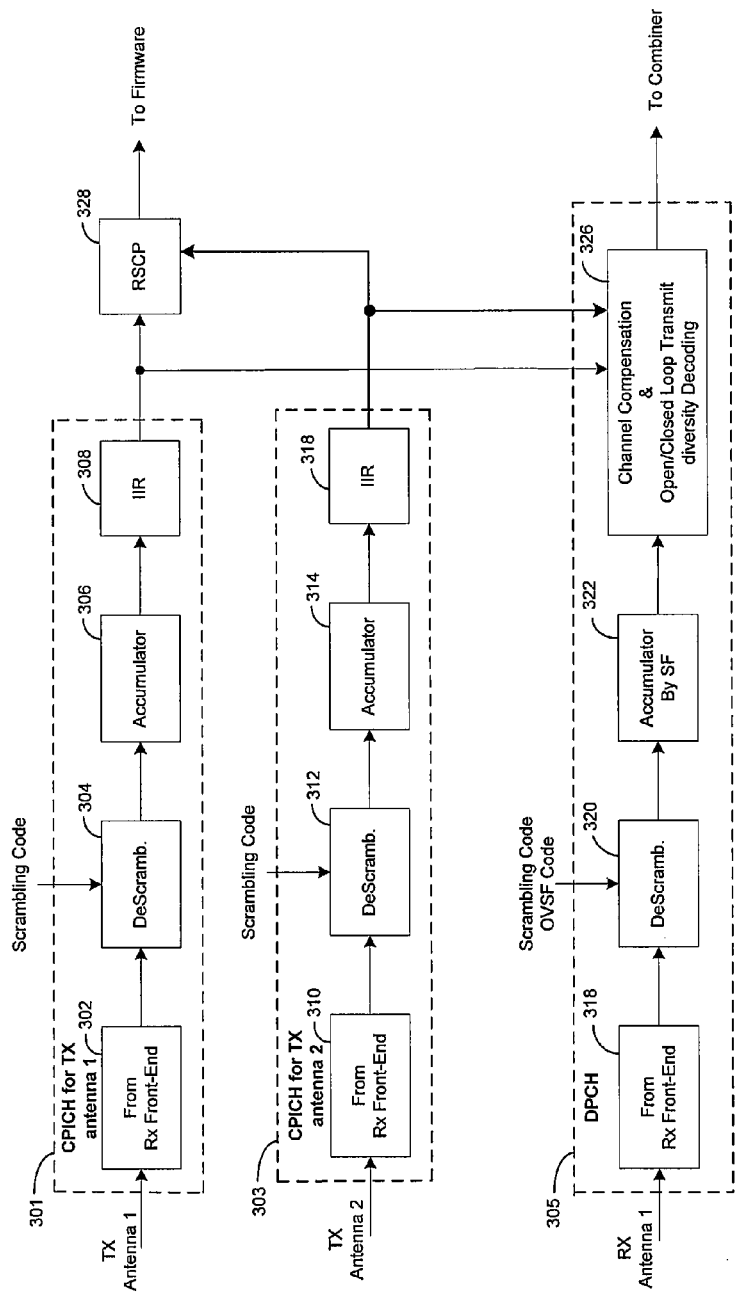
FIG. 3A is a block diagram of an exemplary finger structure for transmit antenna diversity, in accordance with an embodiment of the invention.

FIG. 3A is a block diagram of an exemplary finger structure for transmit antenna diversity, in accordance with an embodiment of the invention. Referring to FIG. 3A, there is shown a common pilot channel for transmit antenna 1 (CPICH1) 301, a common pilot channel for transmit antenna 2 (CPICH2) 303, a dedicated physical channel (DPCH) block 305, and received signal code power (RSCP) block 328.

The CPICH1 301 may comprise a receiver frontend block 302, a descrambler 304, an accumulator 306, and an IIR filter 308. The CPICH2 303 may comprise a receiver frontend block 310, a descrambler 312, an accumulator 314, and an IIR filter 316. The DPCH block 305 may comprise a receiver frontend block 318, a descrambler 320, an accumulator 322, and a channel compensation and decoding block 326.

The plurality of receiver frontend blocks 302 and 310 may comprise suitable logic, circuitry, and/or code that may be enabled to process a received RF signal from transmit antenna 1 and transmit antenna 2 respectively. The receiver frontend block 318 may comprise suitable logic, circuitry, and/or code that may be enabled to process a received RF signal from receiver antenna 1. The plurality of receiver frontend blocks 302, 310 and 318 may perform, for example, filtering, amplification, and analog-to-digital (A/D) conversion operations. The plurality of receiver frontend blocks 302, 310 and 318 may be enabled to amplify and convert the received analog RF signal down to baseband. The plurality of receiver frontend blocks 302, 310 and 318 may comprise an analog-to-digital (A/D) converter that may be utilized to digitize the received analog baseband signal.

The plurality of descramblers 304, 312 and 320 may comprise suitable logic, circuitry, and/or code that may be enabled to multiply the received signal by a scrambling code and delayed versions of the scrambling code. Each delay may correspond to a separate multipath that may be combined by the rake receiver 100. The plurality of descramblers 304, 312 and 320 may be enabled to despread the descrambled data of each path by multiplying the descrambled data with the spreading code. The plurality of descramblers 304, 312 and 320 may also be enabled to multiply the received signals by a scrambling code and/or orthogonal variable spreading factor (OVSF) code.

The plurality of accumulators 306, 314 and 322 may comprise suitable logic, circuitry, and/or code that may be enabled to accumulate the descrambled signals from the plurality of descramblers 304, 312 and 320 respectively. The plurality of IIR filters 308 and 318 may comprise suitable logic, circuitry, and/or code that may be enabled to IIR filter the received signal paths from the plurality of accumulators 306 and 314 respectively and generate an output signal to the RSCP block 328 and the channel compensation and decoding block 326.

The channel compensation and decoding block 326 may be enabled to combine the same symbols obtained via different paths using the corresponding channel information and a combining scheme like maximum ratio combing (MRC) and an output signal may be generated to a combiner. The RSCP block 328 may comprise suitable logic, circuitry, and/or code that may be enabled to measure the receive signal code power or the SNR of the plurality of multipath signals from transmit antenna 1 and transmit antenna 2 and generate the output signals to a control unit/firmware.

The generalization code of at least one pilot channel, for example, CPICH1 301 or CPICH2 303, which may measure signal strengths for each of a plurality of received multipath signals may be modified. The signal strengths of the plurality of received multipath signals may be measured on a pilot channel, CPICH1 301, for example, by assigning its generalization code or scrambling code in the descrambler 304 to zero.

Figure 3B:
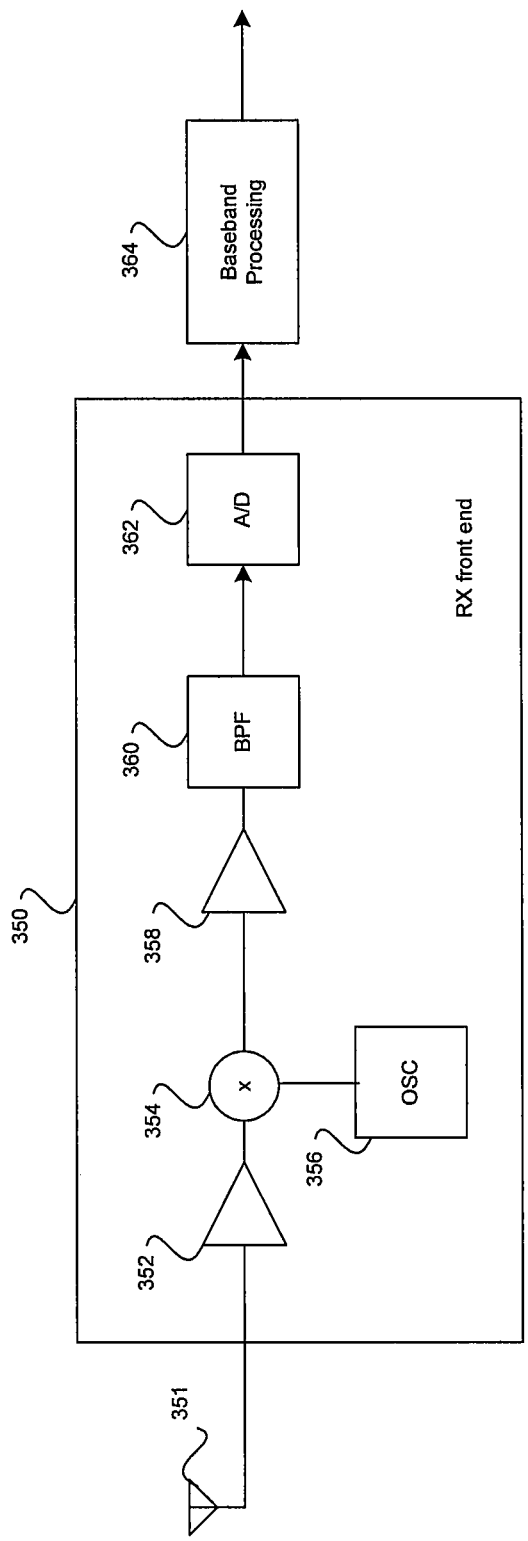
FIG. 3B is a block diagram of an exemplary receiver front end, in accordance with an embodiment of the invention.

FIG. 3B is a block diagram of an exemplary receiver front end, in accordance with an embodiment of the invention. Referring to FIG. 3B, there is shown a receiver frontend block 350, a receiver antenna 351, and a baseband processing block 364. The receiver frontend block 350 may comprise a low noise amplifier (LNA) 352, a mixer 354, an oscillator 356, a low noise amplifier 358, a bandpass filter 360 and an analog-to-digital converter (A/D) 362.

The receiver frontend block 350 may comprise suitable circuitry, logic and/or code that may be enabled to convert a received RF signal down to baseband. An input of the low noise amplifier 352 may be coupled to the antenna 351 so that it may receive RF signals from the antenna 351. The low noise amplifier 352 may comprise suitable logic, circuitry, and/or code that may be enabled to receive an input RF signal from the antenna 351 and amplify the received RF signal in such a manner that an output signal generated by the low noise amplifier 352 has low additional noise.

The mixer 354 in the receiver frontend block 350 may comprise suitable circuitry and/or logic that may be enabled to mix an output of the low noise amplifier 352 with an oscillator signal generated by the oscillator 356. The oscillator 356 may comprise suitable circuitry and/or logic that may be enabled to provide a oscillating signal that may be enabled to mix the output signal generated from the output of the low noise amplifier 352 down to a baseband. The low noise amplifier (LNA) or amplifier 358 may comprise suitable circuitry and/or logic that may be enabled to low noise amplify and output signal generated by the mixer 354. An output of the low noise amplifier or amplifier 358 may be communicated to the transmit path bandpass filter 360. The bandpass filter 360 may comprise suitable logic, circuitry and/or code that may be enabled to bandpass filter the output signal generated from the output of the low noise amplifier 360. The bandpass filter block 360 may be enabled to retain a desired signal and filter out unwanted signal components such as higher signal components comprising noise. An output of the bandpass filter 360 may be communicated to the analog-digital-converter 362 for processing.

The analog-to-digital converter (A/D) 362 may comprise suitable logic, circuitry and/or code that may be enabled to convert the analog signal generated from the output of the transmit path bandpass filter 360 to a digital signal. The analog-to-digital converter 362 may generate a sampled digital representation of the bandpass filtered signal that may be communicated to the baseband-processing block 364 for processing. The baseband processing block 364 may comprise suitable logic, circuitry and/or code that may be enabled to process digital baseband signals received form an output of the A/D 362. Although the A/D 362 is illustrated as part of the receiver frontend block 350, the invention may not be so limited. Accordingly, the A/D 362 may be integrated as part of the baseband processing block 364. In operation, the receiver frontend block 350 may be enabled to receive RF signals via antenna 351 and convert the received RF signals to a sampled digital representation, which may be communicated to the baseband processing block 364 for processing.

Figure 4:
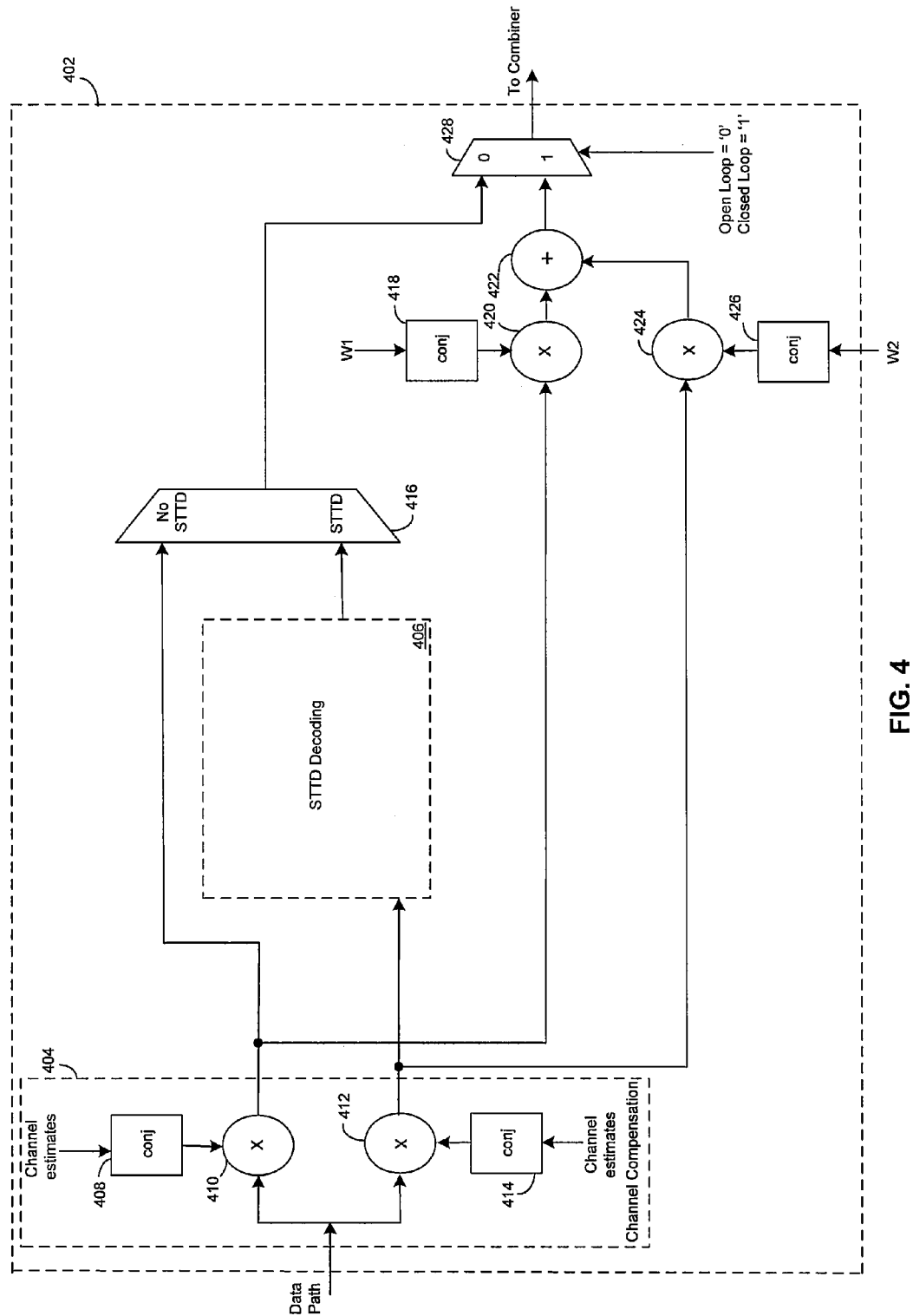
FIG. 4 is an exemplary block diagram illustrating derotation and decoding of received signals in a rake receiver, in accordance with an embodiment of the invention.

FIG. 4 is an exemplary block diagram illustrating derotation and decoding of received signals in a rake receiver, in accordance with an embodiment of the invention. Referring to FIG. 4, there is shown a channel compensation and space time transmit diversity (STTD) decoding block 402. The channel compensation and STTD decoding block 402 may comprise a channel compensation block 404, a STTD decoding block 406, a plurality of multiplexers 416 and 428, a plurality of multipliers 420 and 424, a plurality of conjugate blocks 418 and 426, and a summer 422.

The channel compensation block 404 may comprise a plurality of conjugate blocks 408 and 414, and a plurality of multipliers 410 and 412. The channel compensation block 404 may be enabled to receive the data signals from the accumulator 322. The channel compensation block 404 may be enabled to receive the channel estimates, h1$n$ or h3$n$ from the IIR filter 308 in CPICH 1 301. The channel estimation block 404 may be enabled to receive the channel estimates, h2$n$ or h4$n$ from the IIR filter 316 in CPICH 2 303.

The plurality of conjugate blocks 408 and 414 may be enabled to generate the conjugates of the received channel estimates, h1$n$ and h2$n$, from the IIR filters 308 and 316 respectively. The multiplier 410 may be enabled to multiply the received data signal from the accumulator 322 and the conjugate of the channel estimate h1$n$ and generate a first derotated output. The multiplier 412 may be enabled to multiply the received data signal from the accumulator 322 and the conjugate of the channel estimate h2$n$ and generate a second derotated output. The first derotated output may be received by the multiplexer 416. The second derotated output may be received by the STTD decoding block 406.

The STTD decoding block 406 may comprise suitable logic, circuitry, and/or code that may be enabled to receive a derotated output signal from the channel compensation block 404 and decode the received derotated signal based on open or closed loop transmit diversity and generate a decoded output signal to the multiplexer 416.

The multiplexer 416 may be enabled to receive a first derotated output from the channel compensation block 404 and a decoded output signal from the STTD decoding block 06 and select a particular signal based on determining whether transmit diversity has been implemented in the rake receiver. If no transmit diversity has been implemented in the rake receiver, the multiplexer 416 may be enabled to select the first derotated output from the channel compensation block 404 and output the selected derotated output to the combiner via the multiplexer 428. If transmit diversity has been implemented in the rake receiver, the multiplexer 416 may be enabled to select the decoded output signal from the STTD decoding block 406 and generate an output to the multiplexer 428.

For closed loop transmit diversity, the plurality of conjugate blocks 418 and 426 may be enabled to receive a plurality of weight factors $W_1$ and $W_2$, respectively. For example, for finger 0, the plurality of conjugate blocks 418 and 426 may be enabled to generate the conjugates of the received weight factors, W1_0 and W2_0 respectively.

The multiplier 420 may be enabled to multiply the received first derotated output from the channel compensation block 404 and the conjugate of the received weight factor W1_0 and generate a first output to the summer 422. The multiplier 424 may be enabled to multiply the received second derogated output from the channel compensation block 404 and the conjugate of the received weight factor W2_0 and generate a second output to the summer 422. The summer 422 may be enabled to sum the received first and second outputs and generate an output to the multiplexer 428.

For open loop transmit diversity, the multiplexer 428 may be enabled to select the received output from the multiplexer 416 and generate an output to the combiner. For closed loop transmit diversity, the multiplexer 428 may be enabled to select the received output from the summer 422, and generate an output to the combiner.

Figure 5A:
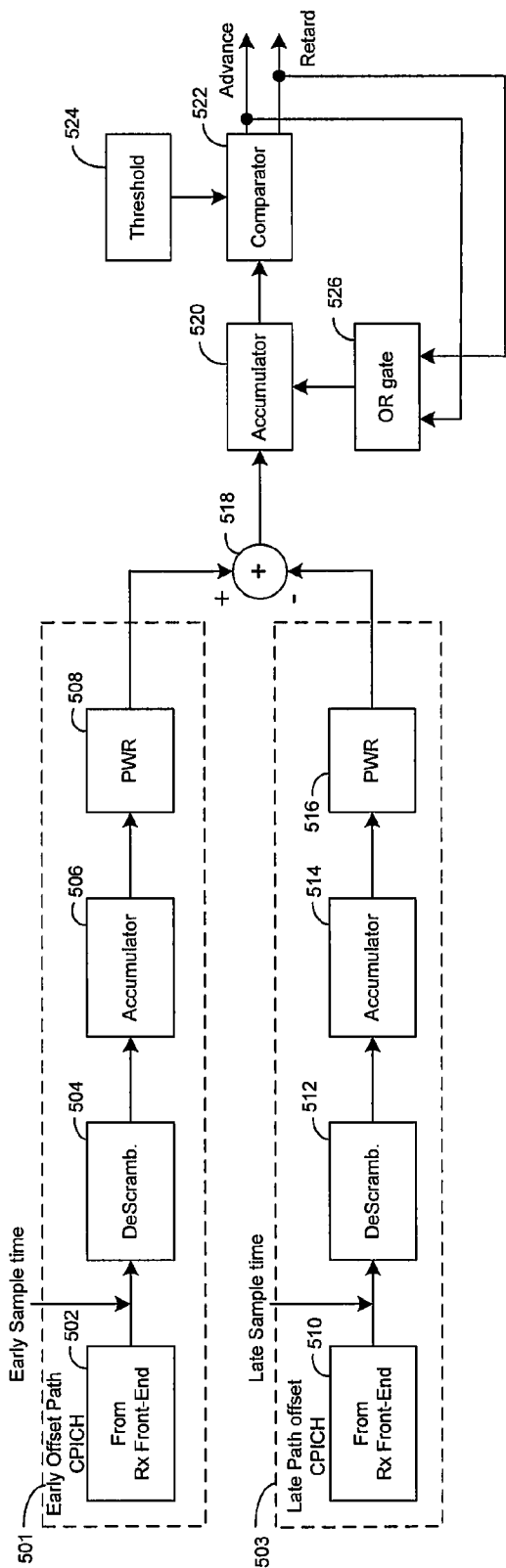
FIG. 5A is a block diagram of an exemplary delay locked loop for a rake receiver based on a difference of channel signal power, in accordance with an embodiment of the invention.

FIG. 5A is a block diagram of an exemplary delay locked loop for a rake receiver based on a difference of channel signal power, in accordance with an embodiment of the invention. Referring to FIG. 5A, there is shown an early offset path common pilot channel (CPICH) 501, a late offset path CPICH 503, a summing block 518, an accumulator 520, a comparator 522, a threshold value 524, and an OR gate block 526. The early offset path CPICH 501 may comprise a receiver frontend block 502, a descrambler 504, an accumulator 506, and a power block 508. The late offset path CPICH 503 may comprise a receiver frontend block 510, a descrambler 512, an accumulator 514, and a power block 516. The early offset path CPICH 501 may be ahead of the on-time CPICH by a particular time period. The late offset path CPICH 503 may be delayed with respect to the on-time CPICH by a particular time period.

The plurality of receiver frontend blocks 502 and 510 may comprise suitable logic, circuitry, and/or code that may be enabled to process a received RF signal from the transmit antenna. The plurality of receiver frontend blocks 502 and 510 may perform, for example, filtering, amplification, and analog-to-digital (A/D) conversion operations. The plurality of receiver frontend blocks 502 and 510 may be enabled to amplify and convert the received analog RF signals down to baseband. The plurality of receiver frontend blocks 502 and 510 may each comprise an analog-to-digital (A/D) converter that may be utilized to digitize the received analog baseband signal.

The plurality of descramblers 504 and 512 may comprise suitable logic, circuitry, and/or code that may be enabled to multiply the received signals by a scrambling code and delayed versions of the scrambling code. The plurality of descramblers 504 and 512 may be enabled to despread the descrambled data of each path by multiplying the descrambled data with the spreading code. The descramblers 512 and 520 may also be enabled to multiply the received signals by a scrambling code and/or orthogonal variable spreading factor (OVSF) code.

The plurality of accumulators 506 and 514 may comprise suitable logic, circuitry, and/or code that may be enabled to accumulate the descrambled signals from the plurality of descramblers 504 and 512 respectively. The power block 508 may comprise suitable logic, circuitry, and/or code that may be enabled to calculate the signal power of the early offset path CPICH 501. The signal power may be based on a square of an amplitude of the early offset path CPICH 501, for example. The power block 516 may comprise suitable logic, circuitry, and/or code that may be enabled to calculate the signal power of the late offset path CPICH 503. The signal power may be based on a square of an amplitude of the late offset path CPICH 503, for example.

The summing block 518 may be enabled to sum or subtract the signal power of the early offset path CPICH 501 calculated by the power block 508 and the signal power of the late offset path CPICH 503 calculated by the power block 516. The accumulator 520 may comprise suitable logic, circuitry, and/or code that may be enabled to accumulate and store the difference of the signal power of the early offset path CPICH 501 calculated by the power block 508 and the signal power of the late offset path CPICH 503 calculated by the power block 516. The comparator 522 may comprise suitable logic, circuitry, and/or code that may be enabled to compare the accumulated difference of the signal power of the early offset path CPICH 501 calculated by the power block 508 and the signal power of the late offset path CPICH 503 calculated by the power block 516 with a threshold value 524, and generate a plurality of advance/retard signals to control the sampling time of the finger for the control channel and the data channel. The advance/retard signals may be inputs to the OR gate block 526. The OR gate block 526 may comprise suitable logic, circuitry, and/or code that may be enabled to clear the accumulator 520. The OR gate block 526 may be enabled to receive the plurality of advance/retard signals, that may clear the accumulator block 520. The comparator block 522 output may be utilized to adjust the sampling time or phase of the rake finger for the control channel and the data channel.

Figure 5B:
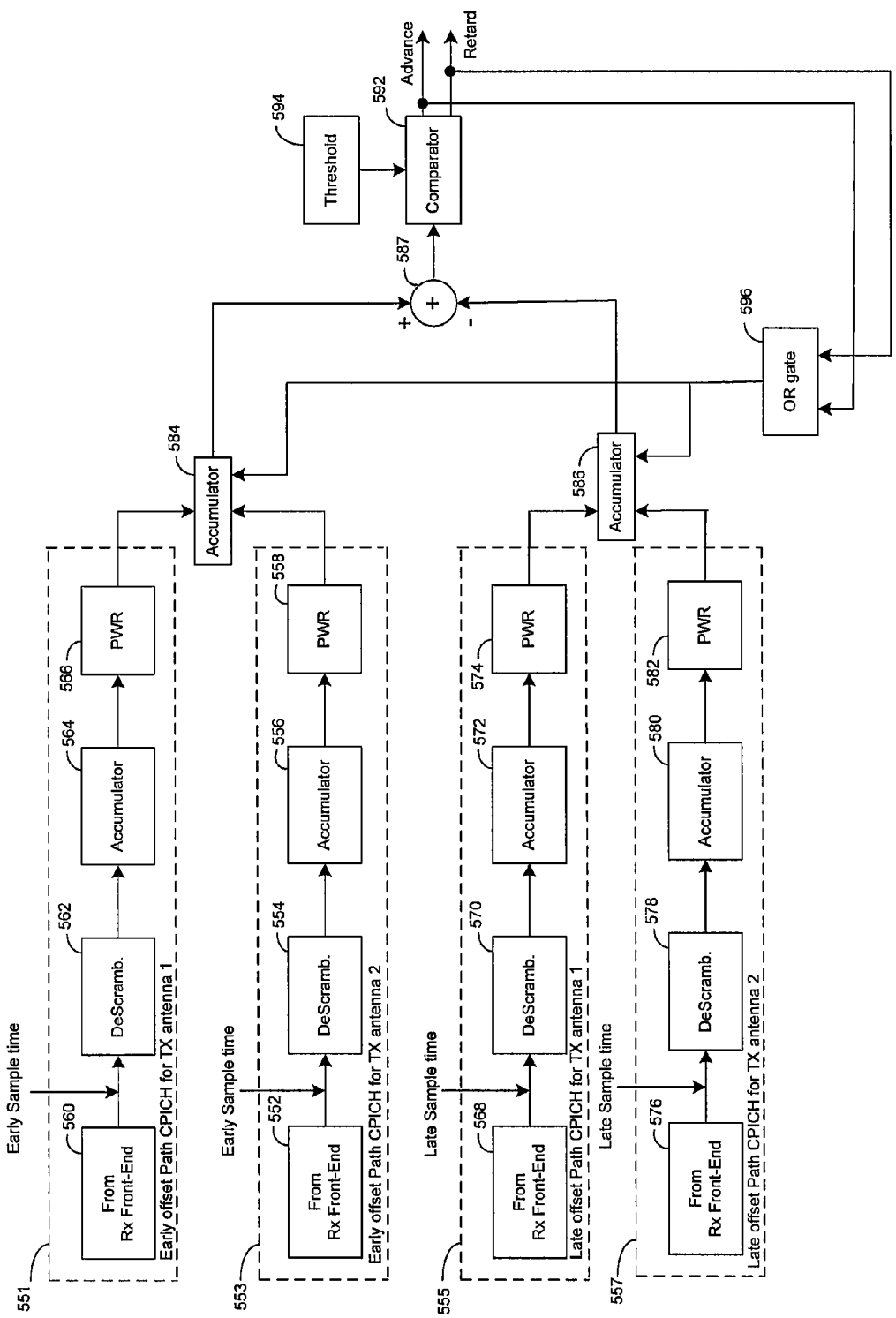
FIG. 5B is a block diagram of an exemplary delay locked loop for a rake receiver with transmit diversity based on a difference of channel signal power, in accordance with an embodiment of the invention.

FIG. 5B is a block diagram of an exemplary delay locked loop for a rake receiver with transmit diversity based on a difference of channel signal power, in accordance with an embodiment of the invention. Referring to FIG. 5B, there is shown an early offset path common pilot channel (CPICH) for TX antenna 1 CPICH 551, an early offset path CPICH for TX antenna 2 CPICH 553, a late offset path CPICH for TX antenna 1 CPICH 555, a late offset path CPICH for TX antenna 2 CPICH 557, a plurality of accumulators 584 and 586, a summing block 587, a comparator 592, a threshold value 594, and an OR gate block 596. The early offset path for TX antenna 1 CPICH 551 may be ahead of the on-time CPICH by a particular time period. The late offset path for TX antenna 1 CPICH 555 may be delayed with respect to the on-time CPICH by a particular time period. The early offset path for TX antenna 2 CPICH 553 may be ahead of the on-time CPICH by a particular time period. The late offset path for TX antenna 2 CPICH 557 may be delayed with respect to the on-time CPICH by a particular time period.

The CPICH 551 may comprise a receiver frontend block 560, a descrambler 562, an accumulator 564, and a power block 566. The CPICH 553 may comprise a receiver frontend block 552, a descrambler 554, an accumulator 556, and a power block 558. The CPICH 555 may comprise a receiver frontend block 568, a descrambler 570, an accumulator 572, and a power block 574. The CPICH 557 may comprise a receiver frontend block 576, a descrambler 578, an accumulator 580, and a power block 582.

The plurality of receiver frontend blocks 560 and 552 may comprise suitable logic, circuitry, and/or code that may be enabled to process a received early offset path RF signal from the transmit antenna 1. The plurality of receiver frontend blocks 568 and 576 may comprise suitable logic, circuitry, and/or code that may be enabled to process a received early offset path RF signal from the transmit antenna 2. The plurality of receiver frontend blocks 560, 552, 568 and 576 may perform, for example, filtering, amplification, and analog-to-digital (A/D) conversion operations. The plurality of receiver frontend blocks 560, 552, 568 and 576 may be enabled to amplify and convert the received analog RF signals down to baseband. The plurality of receiver frontend blocks 560, 552, 568 and 576 may each comprise an analog-to-digital (A/D) converter that may be utilized to digitize the received analog baseband signal.

The plurality of descramblers 562, 554, 570 and 578 may be substantially as described in FIG. 5A. The plurality of accumulators 564, 556, 572, and 580 may be substantially as described in FIG. 5A. The plurality of power blocks 566, 558, 574, and 582 may comprise suitable logic, circuitry, and/or code that may be enabled to calculate the signal power of CPICH 551, CPICH 553, CPICH 555, and CPICH 557 respectively. The signal power may be based on a square of an amplitude of the corresponding CPICH. The accumulator 584 may comprise suitable logic, circuitry, and/or code that may be enabled to accumulate and store the determined signal powers of CPICH 551 and CPICH 553 and generate an output to the summer 587. The accumulator 586 may comprise suitable logic, circuitry, and/or code that may be enabled to accumulate and store the determined signal powers of CPICH 555 and CPICH 557 and generate an output to the summer 587.

The summing block 587 may be enabled to sum or subtract the accumulated signal power by the accumulator 584 and the accumulated signal power by the accumulator 586. The comparator 592 may comprise suitable logic, circuitry, and/or code that may be enabled to compare the accumulated difference of the signal power of the early offset path CPICH and the signal power of the late offset path CPICH with a threshold value 594, and generate a plurality of enable signals to the OR gate block 596. The OR gate block 596 may comprise suitable logic, circuitry, and/or code that may be enabled to clear the plurality of accumulators 584 and 586. The OR gate block 596 may be enabled to receive the plurality of advance/retard signals to control the sampling time of the finger for the control and data channel. The advance/retard signals may be inputs to the OR gate block 596. The OR gate block 596 may be enabled to receive a plurality of advance/retard signals and may clear the plurality of accumulator blocks 584 and 586. The comparator block 592 output may be utilized to adjust the sampling time or phase of the rake finger for the control channel and the data channel.

Figure 6A:
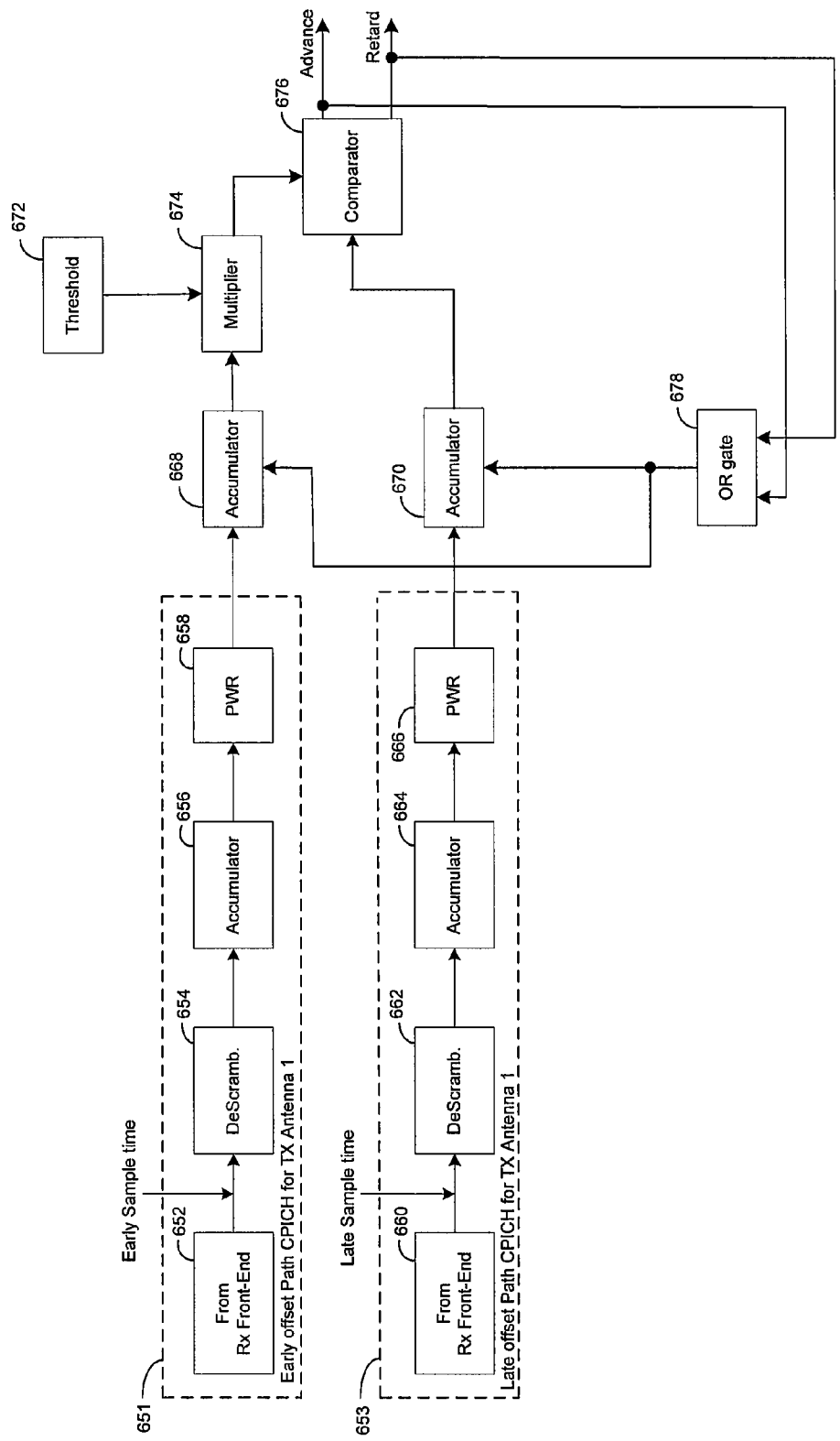
FIG. 6A is a block diagram of an exemplary delay locked loop for a rake receiver, in accordance with an embodiment of the invention.

FIG. 6A is a block diagram of an exemplary delay locked loop for a rake receiver, in accordance with an embodiment of the invention. Referring to FIG. 6A, there is shown an early offset path common pilot channel (CPICH) for antenna 1 CPICH 651, a late offset path CPICH for antenna 1 CPICH 653, a plurality of accumulators 668 and 670, a multiplier 674, a threshold value 672, a comparator 676, and an OR gate block 678.

The CPICH 651 may comprise a receiver frontend block 652, a descrambler 654, an accumulator 656, and a power block 658. The CPICH 653 may comprise a receiver frontend block 660, a descrambler 662, an accumulator 664, and a power block 666. The plurality of blocks in CPICH 651 and CPICH 653 may be substantially as described in FIG. 5A. The CPICH 653 may be delayed with respect to CPICH 651 by a particular time period.

The power blocks 658 and 666 may comprise suitable logic, circuitry, and/or code that may be enabled to calculate the signal power of CPICH 651 and the signal power of CPICH 653 respectively. The signal power may be based on a square of an amplitude of CPICH 651, for example, or on a square of an amplitude of the CPICH 653.

The accumulator 668 may comprise suitable logic, circuitry, and/or code that may be enabled to accumulate the signal power of CPICH 651 calculated by the power block 658. The multiplier 674 may be enabled to multiply and normalize the accumulated signal power of CPICH 651 with the threshold value 672. The accumulator 670 may comprise suitable logic, circuitry, and/or code that may be enabled to accumulate the signal power of CPICH 653 calculated by the power block 666.

The comparator 676 may comprise suitable logic, circuitry, and/or code that may be enabled to compare the normalized accumulated signal power of CPICH 651 with the accumulated signal power of CPICH 653, and generate a plurality of advance/retard signals to control the sampling time of the finger for the control channel and the data channel. The advance/retard signals may be inputs to the OR gate block 678. The OR gate block 678 may comprise suitable logic, circuitry, and/or code that may be enabled to clear the plurality of accumulators 668 and 670. The OR gate block 678 may be enabled to receive the plurality advance/retard signals and may clear the plurality of accumulator blocks 668 and 670. The comparator block 676 output may be utilized to adjust the sampling time or phase of the rake finger for the control channel and the data channel.

Figure 6B:
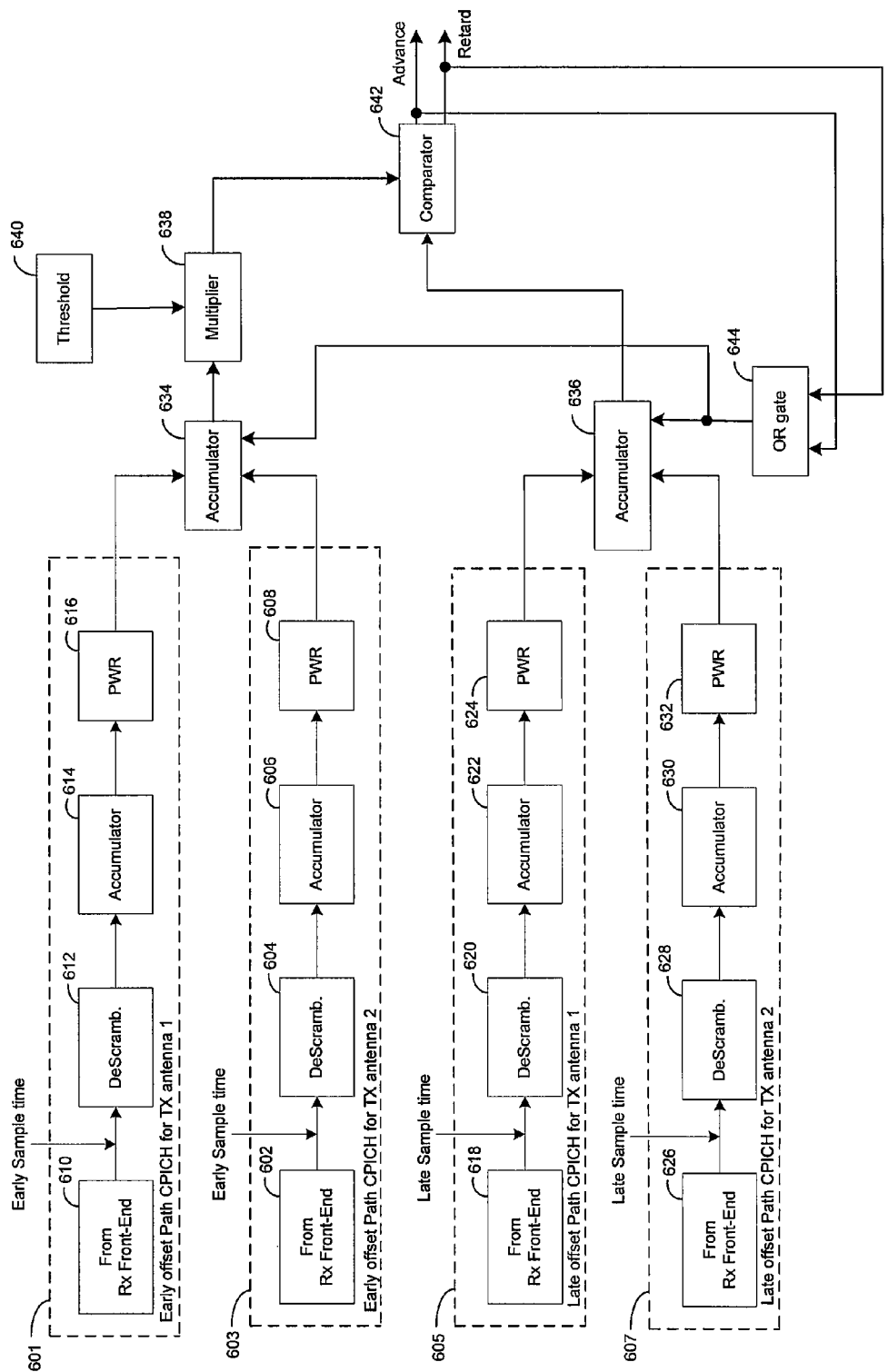
FIG. 6B is a block diagram of an exemplary delay locked loop for a rake receiver with transmit diversity, in accordance with an embodiment of the invention.

FIG. 6B is a block diagram of an exemplary delay locked loop for a rake receiver with transmit diversity, in accordance with an embodiment of the invention. Referring to FIG. 6B, there is shown an early offset path common pilot channel (CPICH) for antenna 1 CPICH 601, an early offset path CPICH for antenna 2 CPICH 603, a late offset path CPICH for antenna 1 CPICH 605, and a late offset path CPICH for antenna 2 CPICH 605, a plurality of accumulators 634 and 636, a multiplier 638, a threshold value 640, a comparator 642, and an OR gate block 644. The early offset path for TX antenna 1 CPICH 601 may be ahead of the on-time CPICH by a particular time period. The late offset path for TX antenna 1 CPICH 605 may be delayed with respect to the on-time CPICH by a particular time period. The early offset path for TX antenna 2 CPICH 553 may be ahead of the on-time CPICH by a particular time period. The late offset path for TX antenna 2 CPICH 557 may be delayed with respect to the on-time CPICH by a particular time period.

The CPICH 601 may comprise a receiver frontend block 610, a descrambler 612, an accumulator 614, and a power block 616. The CPICH 603 may comprise a receiver frontend block 602, a descrambler 604, an accumulator 606, and a power block 608. The CPICH 605 may comprise a receiver frontend block 618, a descrambler 620, an accumulator 622, and a power block 624. The CPICH 607 may comprise a receiver frontend block 626, a descrambler 628, an accumulator 630, and a power block 632.

The plurality of blocks in CPICH 601, CPICH 603, the CPICH 605, and the CPICH 607 may be substantially as described in FIG. 5A. The process of achieving diversity gain may be utilized to combat multipath fading in wireless cellular communication systems, since the signal quality may be improved without increasing the transmit power or loss of bandwidth efficiency. In a single antenna W-CDMA handset, the fading from different multipath signals may be independent. The receiver may be enabled to demodulate the same signal from a few different multipath signals and combine the various multipath signals. The resulting combined signal may be stronger than a single signal. The CPICH 605 may be delayed with respect to CPICH 601 by a particular time period. Similarly, the CPICH 607 may be delayed with respect to CPICH 603 by a particular time period.

The power blocks 616 and 608 may comprise suitable logic, circuitry, and/or code that may be enabled to calculate the signal power of CPICH 601 and the signal power of CPICH 603 respectively. The signal power may be based on a square of an amplitude of CPICH 601, for example, or on a square of an amplitude of the CPICH 603. The power blocks 624 and 632 may comprise suitable logic, circuitry, and/or code that may be enabled to calculate the signal power of CPICH 605 and the signal power of CPICH 607 respectively. The signal power may be based on a square of an amplitude of CPICH 605, for example, or on a square of an amplitude of CPICH 607.

The accumulator 634 may comprise suitable logic, circuitry, and/or code that may be enabled to accumulate and store the sum of the signal power of CPICH 601 calculated by the power block 616 and the signal power of CPICH 603 calculated by the power block 608. The multiplier 638 may be enabled to multiply and normalize the accumulated sum of the signal power of CPICH 601 and the signal power of CPICH 603 with the threshold value 640. The accumulator 636 may comprise suitable logic, circuitry, and/or code that may be enabled to accumulate and store the sum of the signal power of CPICH 605 calculated by the power block 624 and the signal power of CPICH 607 calculated by the power block 632.

The comparator 642 may comprise suitable logic, circuitry, and/or code that may be enabled to compare the normalized accumulated signal power of CPICH 601 and the signal power of CPICH 603 with the accumulated sum of the signal power of CPICH 605 and the signal power of CPICH 607, and generate a plurality of advance/retard signals to control the sampling time of the rake finger for the control channel and the data channel. The advance/retard signals may be inputs to the OR gate block 644.

The OR gate block 644 may comprise suitable logic, circuitry, and/or code that may be enabled to clear the plurality of accumulators 634 and 636. The OR gate block 644 may be enabled to receive the plurality of advance/retard signals and may clear the plurality of accumulator blocks 634 and 636. The comparator block 642 output may be utilized to adjust the sampling time or phase of the rake finger for the control channel and the data channel.

In accordance with an embodiment of the invention, a method and system for a delay locked loop for a rake receiver may comprise one or more circuits that enables normalizing a signal power of a first control channel, for example, the early offset path common pilot control channel (CPICH) for antenna 1 CPICH 601 based on a threshold value 640. One or more circuits may enable adjustment of a sampling time associated with at least one or more of the following: the first control channel, for example, the early offset path CPICH for antenna 1 CPICH 601 and a second control channel, for example, the late offset path CPICH for antenna 1 CPICH 605, the on-time control channel, and a data channel, for example, DPCH 305 based on a comparison between the normalized signal power of the first control channel, for example, the early offset path CPICH for antenna 1 CPICH 601 and a signal power of the second control channel, for example, the late offset path CPICH for antenna 1 CPICH 605. The second control channel, for example, the late offset path CPICH for antenna 1 CPICH 605 may be delayed with respect to the first control channel, for example, the early offset path CPICH for antenna 1 CPICH 601 by a particular time period.

The OR gate block 644 may enable clearing the plurality of accumulators 634 and 636 based on the comparison between the normalized signal power of the first control channel, for example, the early offset path CPICH for antenna 1 CPICH 601 and a signal power of the second control channel, for example, the late offset path CPICH for antenna 1 CPICH 605. The accumulator 634 may be enabled to combine the signal power of the first control channel of two or more antennas. For example, the accumulator 634 may be enabled to combine the signal power of the early offset path CPICH for antenna 1 CPICH 601 and the signal power of the early offset path CPICH for antenna 2 CPICH 603. The rake receiver 100 may enable normalization of the combined signal power of the first control channels based on the threshold value 640. For example, the rake receiver 100 may enable normalization of the combined signal power of the early offset path CPICH for antenna 1 CPICH 601 and early offset path CPICH for antenna 2 CPICH 603 based on the threshold value 640.

The accumulator 636 may be enabled to combine the signal power of the second control channel of two or more antennas. For example, the accumulator 636 may be enabled to combine the signal power of the late offset path CPICH for antenna 1 CPICH 605 and the signal power of the late offset path CPICH for antenna 2 CPICH 607. One or more circuits may enable adjustment of the sampling time associated with the first control channel, for example, the combined signal power of the early offset path CPICH for antenna 1 CPICH 601 and the early offset path CPICH for antenna 2 CPICH 603, an on-time control channel, and a data channel, for example, DPCH 305 based on a comparison between the normalized combined signal power of the first control channel, for example, the early offset path CPICH for antenna 1 CPICH 601 and the early offset path CPICH for antenna 2 CPICH 603 and the combined signal power of the second control channel, for example, the late offset path CPICH for antenna 1 CPICH 605 and the late offset path CPICH for antenna 2 CPICH 607.

One or more circuits may enable adjustment of the offset associated with the second control channel, for example, the combined signal power of the late offset path CPICH for antenna 1 CPICH 605 and the late offset path CPICH for antenna 2 CPICH 607 based on a comparison between the normalized combined signal power of the first control channel, for example, the early offset path CPICH for antenna 1 CPICH 601 and the early offset path CPICH for antenna 2 CPICH 603 and the combined signal power of the second control channel, for example, the late offset path CPICH for antenna 1 CPICH 605 and the late offset path CPICH for antenna 2 CPICH 607.

Another embodiment of the invention may provide a machine-readable storage, having stored thereon, a computer program having at least one code section executable by a machine, thereby causing the machine to perform the steps as described above for delay locked loop for rake receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A delay locked loop (DLL) comprising:
    first and second front-ends configured to respectively receive first and second signals from first and second channels;
    first and second descramblers configured to respectively descramble the first and second signals to provide first and second descrambled signals;
    first and second accumulators configured to respectively accumulate the first and second descrambled signals to provide first and second accumulated signals;
    first and second power blocks configured to respectively calculate first and second signal powers associated with the first and second accumulated signals;
    a difference block configured to calculate a difference between the first and second signal powers; and
    a comparator configured to compare the difference with a threshold value, and to provide a control signal to adjust a sampling time associated with a data channel and at least one of the first and second channels based on a result of the comparison.

2. The DLL of claim 1, wherein the second signal received from the second channel is delayed with respect to the first signal received from the first channel by a predetermined time.

3. The DLL of claim 1, wherein the first signal power is based on a square of an amplitude associated with the first channel and the second signal power is based on a square of an amplitude associated with the second channel.

4. The DLL of claim 1, wherein the first descrambler is configured to multiply the first signal by a first scrambling code and by a delayed version of the first scrambling code to provide the first descrambled signal.

5. The DLL of claim 1, wherein the first descrambler is configured to multiply descrambled data included in the first signal with a spreading code to despread the descrambled data.

6. The DLL of claim 1, further comprising:
    a third accumulator configured to store the difference between the first and second signal powers in a memory, the memory being configured to be cleared based on an output of the comparator.

7. The DLL of claim 1, further comprising:
    a multiplier configured to multiply the first signal power with the threshold value to normalize the first signal power.

8. The DLL of claim 1, wherein the data channel is a dedicated physical channel (DPCH).

9. The DLL of claim 1, wherein the first and second channels are common pilot control channels (CPICH).

10. The DLL of claim 1, wherein the DLL is included in a rake receiver having a plurality of rake fingers.

11. A method comprising:
    receiving, in a delay locked loop (DLL), first and second signals from first and second channels respectively;
    descrambling, in the DLL, the first and second signals to provide first and second descrambled signals respectively;

accumulating, in the DLL, the first and second descrambled signals to provide first and second accumulated signals respectively;

calculating, in the DLL, first and second signal powers associated with the first and second accumulated signals respectively;

calculating, in the DLL, a difference between the first and second signal powers; and comparing, in the DLL, the difference with a threshold value, and providing a signal to adjust a sampling time associated with a data channel and at least one of the first and second channels based on a result of the comparing.

12. The method of claim 11, wherein the receiving includes receiving the second signal from the second channel after a predetermined time with respect to receiving the first signal from the first channel.

13. The method of claim 11, wherein the calculating the first and second signal powers includes calculating the first signal power based on a square of an amplitude associated with the first channel and calculating the second signal power based on a square of an amplitude associated with the second channel.

14. The method of claim 11, wherein the descrambling includes multiplying the first signal by a first scrambling code and by a delayed version of the first scrambling code to provide the first descrambled signal.

15. The method of claim 11, further comprising:
despreading descrambled data included in the first signal by multiplying the descrambled data with a spreading code.

16. The method of claim 11, further comprising:
storing the difference between the first and second signal powers in a memory, the memory being configured to be cleared based on an output of the comparing.

17. The method of claim 11, further comprising:
normalizing the first signal power by multiplying the first signal power with the threshold value.

18. The method of claim 11, wherein the first and second channels are common pilot control channels (CPICH) and the data channel is a dedicated physical channel (DPCH).

19. A rake receiver comprising:
first and second front-ends configured to respectively receive first and second signals from first and second channels, wherein the second signal is delayed with respect to the first signal by a predetermined time;

first and second descramblers configured to respectively descramble the first and second signals to provide first and second descrambled signals, wherein the first descrambler is configured to multiply descrambled data included in the first signal with a spreading code to despread the descrambled data;

first and second accumulators configured to respectively accumulate the first and second descrambled signals to provide first and second accumulated signals;

first and second power blocks configured to respectively calculate first and second signal powers associated with the first and second accumulated signals;

a difference block configured to calculate a difference between the first and second signal powers; and a comparator configured to compare the difference with a threshold value, and to provide a control signal to adjust a sampling time associated with a data channel and at least one of the first and second channels based on a result of the comparison.

20. The rake receiver of claim 19, further comprising:
a multiplier configured to multiply the first signal power with the threshold value to normalize the first signal power.

* * * * *